(12) United States Patent
Bernstein et al.

(10) Patent No.: US 7,657,558 B2
(45) Date of Patent: *Feb. 2, 2010

(54) ESTABLISHING RELATIONSHIPS BETWEEN OBJECTS BASED ON OBJECT INTERFACES

(75) Inventors: Philip Alan Bernstein, Bellevue, WA (US); David R. Shutt, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 803 days.

This patent is subject to a terminal disclaimer.

(21) Appl. No.: 10/867,516

(22) Filed: Jun. 14, 2004

(65) Prior Publication Data

US 2004/0243605 A1 Dec. 2, 2004

Related U.S. Application Data

(63) Continuation of application No. 09/497,594, filed on Feb. 3, 2000, now Pat. No. 6,766,518.

(51) Int. Cl.
*G06F 7/00* (2006.01)

(52) U.S. Cl. .................................. 707/103 R
(58) Field of Classification Search ................. 707/103, 707/103 R; 717/116, 120, 165
See application file for complete search history.

(56) References Cited

U.S. PATENT DOCUMENTS

| | | | |
|---|---|---|---|
| 5,129,083 A | 7/1992 | Cutler | |
| 5,499,371 A * | 3/1996 | Henninger et al. | 717/108 |
| 5,511,197 A | 4/1996 | Hill | |
| 5,692,184 A * | 11/1997 | Ardoin et al. | 707/103 R |
| 5,710,925 A | 1/1998 | Leach | |
| 5,752,027 A | 5/1998 | Familiar | |
| 5,771,384 A | 6/1998 | Remington | |
| 5,815,710 A | 9/1998 | Martin | |
| 5,905,987 A | 5/1999 | Shutt | |
| 5,995,973 A | 11/1999 | Daudenarde | |
| 6,169,993 B1 | 1/2001 | Shutt | |

FOREIGN PATENT DOCUMENTS

WO     WO 93/21591     * 10/1993

OTHER PUBLICATIONS

Noble, J., Tools 21, Melbourne 1996, pp. 1-15.*

(Continued)

*Primary Examiner*—Cheyne D Ly
(74) *Attorney, Agent, or Firm*—Workman Nydegger

(57) ABSTRACT

In an interface-based object system capable of supporting multiple interfaces into objects, a relationship is defined as a pair of complementary collections on two separate interfaces, each interface found on separate objects. A link between objects is formed when an interface of one object lists an object supporting the related interface included in the object and vice versa. The collections may be of objects supporting the related interfaces or may be of specific relationship objects leading to objects supporting the related interfaces. The collections are potentially multi-valued entities that enable relationships to be established between objects using one-to-one, many-to-one, and many-to-many architectures. By implementing a specific relationship object, behavior may be imparted to the relationship itself thereby providing more robust system behavior. Objects thus linked can be easily traversed so that convenient navigation models can be implemented allowing clients quick access to desired objects by navigating through relationships between objects.

4 Claims, 15 Drawing Sheets

OTHER PUBLICATIONS

Mishra, P., Sigmod Record, vol. 21, No. 1, Mar. 1992, pp. 71-83.*
IBM, Object Relationship Services, OMG TC Document, Nov. 1, 1993.
Groupe Bull, et al, Relationship Service, OMG TC Document, Nov. 1, 1993.
M. L. Powell, Objects, References, Identifiers and Equility White Paper, SunSoft, Jul. 1, 1993.
S. Prata, C++ Primer Plus, Second Ed. Waite Group Press, pp. 580-602, Jan. 1, 1995.
J. Noble, "Some Patterns for Relationships", Sep. 1996. CiteSeer.com.
Office Action dated Mar. 4, 1999 cited in U.S. Appl. No. 08/822,449 (Copy Attached).
Notice of Allowance dated Oct. 1, 1999 cited in U.S. Appl. No. 08/822,449 (Copy Attached).
Office Action dated Nov. 5, 2003 cited in U.S. Appl. No. 09/497,594 (Copy Attached).
Notice of Allowance dated Apr. 6, 2004 cited in U.S. Appl. No. 09/497,594 (Copy Attached).

* cited by examiner

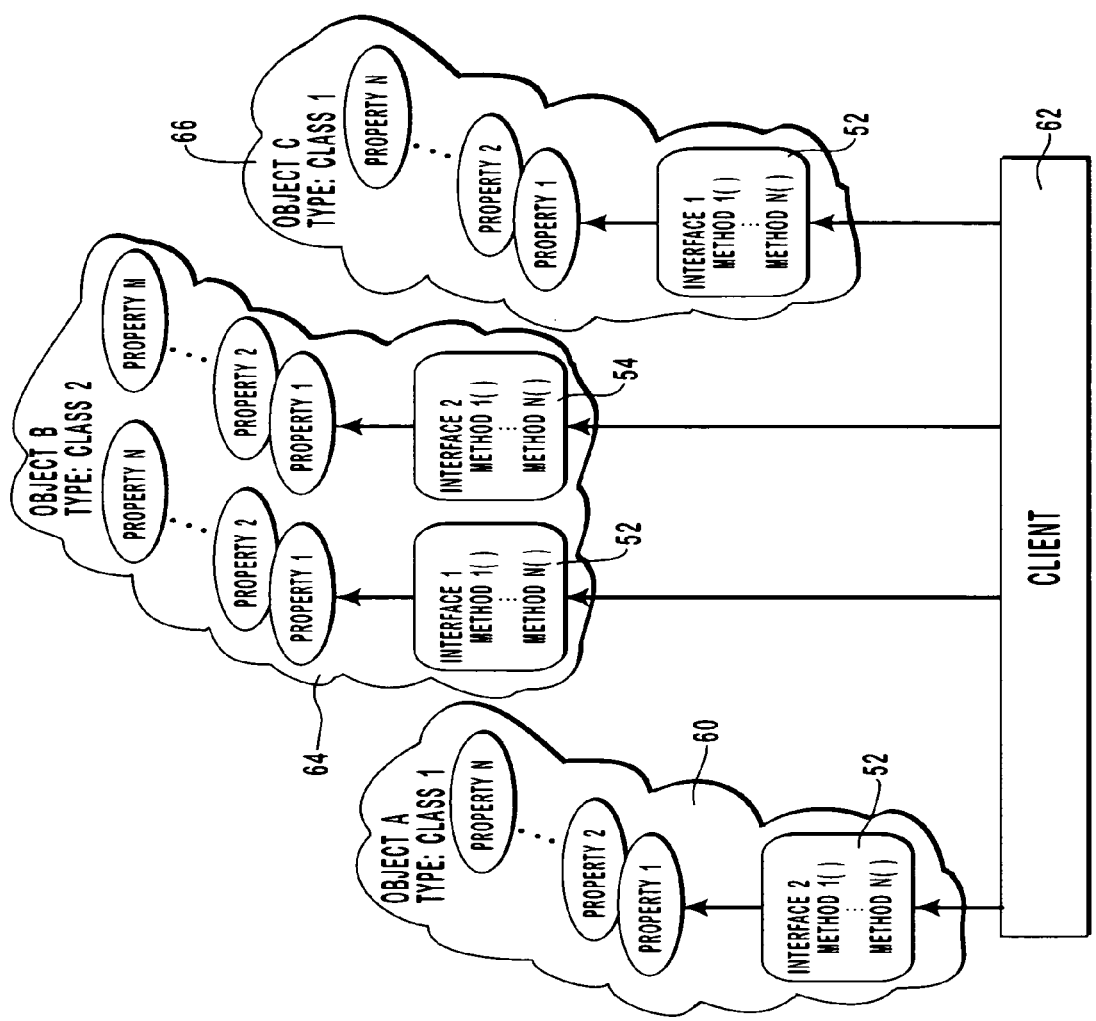
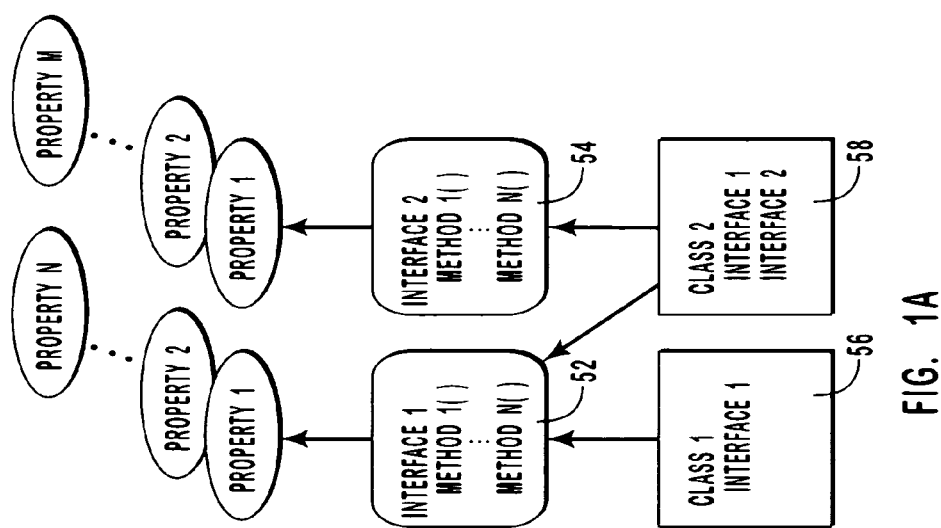
FIG. 1B
FIG. 1A

ESTABLISHING RELATIONSHIPS BETWEEN OBJECTS BASED ON OBJECT INTERFACES

CROSS-REFERENCE TO RELATED APPLICATIONS

The present application is a continuation application of commonly-assigned U.S. patent application Ser. No. 09/497,594 filed Feb. 3, 2000 and entitled "Establishing Relationships Between Objects Based on Object Interfaces," and now issued as U.S. Pat. No. 6,766,518, issued Jul. 20, 2004 which claims priority to U.S. Pat. No. 6,035,342 entitled "Method and Computer Program Product for Implementing Object Relationships" issued Mar. 19, 1997, both of which are incorporated herein by reference.

BACKGROUND OF THE INVENTION

1. The Field of the Invention

This invention relates to the field of object-oriented databases wherein navigation between objects is a fundamental method for finding desired data. More specifically, this invention relates to the methods and structures for creating relationships between software objects in order to assist in object navigation.

2. Background and Relevant Art

Object-oriented systems, including databases, have become prevalent in recent years as a significant design technique that allows high degrees of code reusability between projects and for modeling real world solutions to problems in a more natural way. A software object is composed of data and methods to operate on or manipulate the data and otherwise give the object its "behavior."

In many database applications, it is useful to create a relationship between objects so that a client may navigate from one object to another based on the relationship. The usefulness of relationship navigation derives in part from the different types of objects and their arrangement with respect to one another in forming "models" as part of an implemented software solution. For example, software objects used to present the various pieces in a development environment database would tend to have some very natural relationship. In such a database, an object representing a C++ source file would be related to other objects representing header files and to compiled code generated from the source file.

Relationships allow focused navigation through an object database. For example, a client testing the current state of a completed application in the development environment database would traverse or navigate the relationships between the objects representing the constituent parts to determine which modules would require recompilation or other action.

Furthermore, searches may be made on specific types of relationships to identify objects having a particular characteristic in the structured hierarchy of related objects. The relationship itself becomes an attribute that distinguishes the object.

In some database applications, it is only the state of an object that is stored in a repository. A software client will access the object state by instantiating an object having the assigned state and manipulate the object in order to operate on that state. Other objects may be instantiated as necessary through object methods to gain access to other object states and for navigating through the database. The key to navigating the database are methods that will instantiate necessary objects to traverse relationships between related objects.

By allowing relationships between objects, structure is added to a database of objects and hence greater meaning can be given to the objects and the information represented therein. This allows object-oriented databases to more closely mimic structure and relationships found in the real world problems that object-oriented software products are intended to model.

Currently, relationships or links between objects are made on the entire object, usually defined in the class used to create the object upon instantiation. While this allows relationships to exist between objects, it lacks granularity for allowing objects of different types to be conventionally related without minimizing object functionality or increasing object overhead.

Ways are often sought to present an intuitive model for incrementally adding functionality into objects. One successful approach has been an object system where each object is composed of multiple interfaces, each interface representing a quantum of related functionality. An object is built of necessary interfaces for giving the object the desired character or behavior. It would be advantageous to incorporate relationship behavior on such interfaces to thereby allow interfaces to define relationships rather than object classes.

Methods of creating, managing, and defining object relationships are sought that increase system efficiency, expand potential functionality, are easily extensible, and otherwise add capabilities to object oriented designs. Those methods that allow greater flexibility and the ability to easily relate objects of different types (i.e., those created or instantiated by different classes) to be easily related based on object characteristics rather than the mechanical creation mechanisms are particularly important.

BRIEF SUMMARY OF THE INVENTION

It is an object of the present invention to relate two separately instantiated objects through a logical link.

It is another object of the present invention to provide a navigation mechanism between related objects.

It is a further object of the present invention in some embodiments to represent relationships between objects as separate objects themselves so that behavior may be attributed to such relationship objects.

It is an object of the present invention to relate objects based on characteristics of the related objects rather than simply the class of the object, thereby allowing objects of different types to be easily related.

Additional objects and advantages of the invention will be set forth in the description that follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, a method and computer program product for implementing object relationships is provided.

A relationship is a connection between two objects and is a useful construct for traversing through related objects in an object oriented database or persistent object repository. The present invention is directed to a novel method and program code product for implementing an object relationship in a persistent object repository that stores object states. This is done by defining a relationship as a pair of complementary collections on two separate interfaces, each interface found on separate objects.

A link between objects is formed when an interface of one object lists an object supporting the related interface included in the latter object and vice versa. The collections may be of objects supporting the related interfaces or may be of specific relationship objects leading to objects supporting the related interfaces. By implementing a specific relationship object, behavior may be imparted to the relationship itself.

By defining the relationship on an interface of an object rather than the class of the object, objects of different types created by different classes may be easily related based on the same kind of relationship, due to the different classes supporting the same interface. This creates a more intuitive model since it is object characteristics (as defined by interfaces) that provide functional capabilities to clients rather than mechanisms such as class definitions used to create or instantiate an object.

In a first embodiment, the link between objects is formed when a collection on one interface of one object contains direct references to the related objects supporting the related interface. Correspondingly, a collection exists on objects having the former interface listing related objects supporting the latter interface. Generally, a collection pair relating or linking particular interfaces (and hence the objects supporting those interfaces) has an origin object associated with an origin interface and a destination object associated with a destination interface.

In a second embodiment, each of the collections described previously in connection with the first embodiment is implemented as a specific collection object that may be accessed by a method on an interface of the related objects (origin or destination). This implementation allows more generic navigation models and behavior may be extended from the collection object to implement custom behavior.

In a third embodiment, each of the collection objects described previously in connection with the second embodiment implements a collection of relationship objects that can be used to arrive at the actual related objects supporting the related interface. When implementing a relationship through relationship objects, specific behavior may also be implemented on the relationship object and extended as necessary according to the binary extensibility scheme of the underlying object model.

In a fourth embodiment, the facilities of both the second and third embodiments are combined so that a user has both options available. The more direct collection of objects supporting the related interface provides a more efficient and convenient link when only the related object is desired, while the collection of relationship objects allows behavior to be associated with the relationship itself. Again, both collections on the origin and destination objects are implemented by objects (e.g., one object for each collection) themselves.

In a fifth embodiment, a single collection object is implemented that in turn has the facilities for managing collections of related objects having the related interface, and relationship objects leading to related objects supporting the related interface. In this manner, a single collection object may be accessed by an origin or destination object rather than requiring two separate collection objects as shown in the fourth embodiment.

These embodiments showing implementation variations of the present invention have differing characteristics in terms of extensibility to add custom behavior, performance, and complexity. A designer will choose the embodiment that best suits the application and those skilled in the art may yet see other embodiments that incorporate the present invention.

These and other objects and features of the present invention will become more fully apparent from the following description and appended claims, or may be learned by the practice of the invention as set forth hereinafter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 1A and 1B are logical diagrams showing the relationship between classes, interfaces, properties, objects, and clients. More particularly, FIG. 1A shows a plurality of classes for use as templates to create instantiated objects with each class implementing or supporting one or more interfaces. FIG. 1B shows a client that is accessing or interacting with three objects created by the classes in FIG. 1A through the defined interfaces.

FIG. 5A is a generic terminology diagram while FIG. 5B illustrates the Contains relationship in the address book example as shown graphically in FIG. 3.

FIG. 6A shows the relationship between objects in more detail while FIG. 6B shows the address book example of FIG. 4 as it would appear with relationships implemented using the embodiment of FIG. 6A.

FIG. 7A shows the relationship in more detail while FIG. 7B shows how the address book example of FIG. 4 would appear with relationships implemented according to the embodiment of FIG. 7A.

FIG. 8A shows the relationship implementation in detail while FIG. 8B shows the address book example FIG. 4 as it would appear with relationships implemented according to the embodiment of FIG. 8A.

FIG. 9A shows the relationship as implemented in detail while FIG. 9B shows how the address book example of FIG. 4 would appear with relationships implemented according to the embodiment of FIG. 9A.

FIG. 10A shows the relationship in detail while FIG. 10B shows the address book example of FIG. 4 as it would appear with the relationships implemented according to the embodiment of FIG. 10A.

DETAILED DESCRIPTION OF THE PREFERRED EMBODIMENTS

Figure 2:
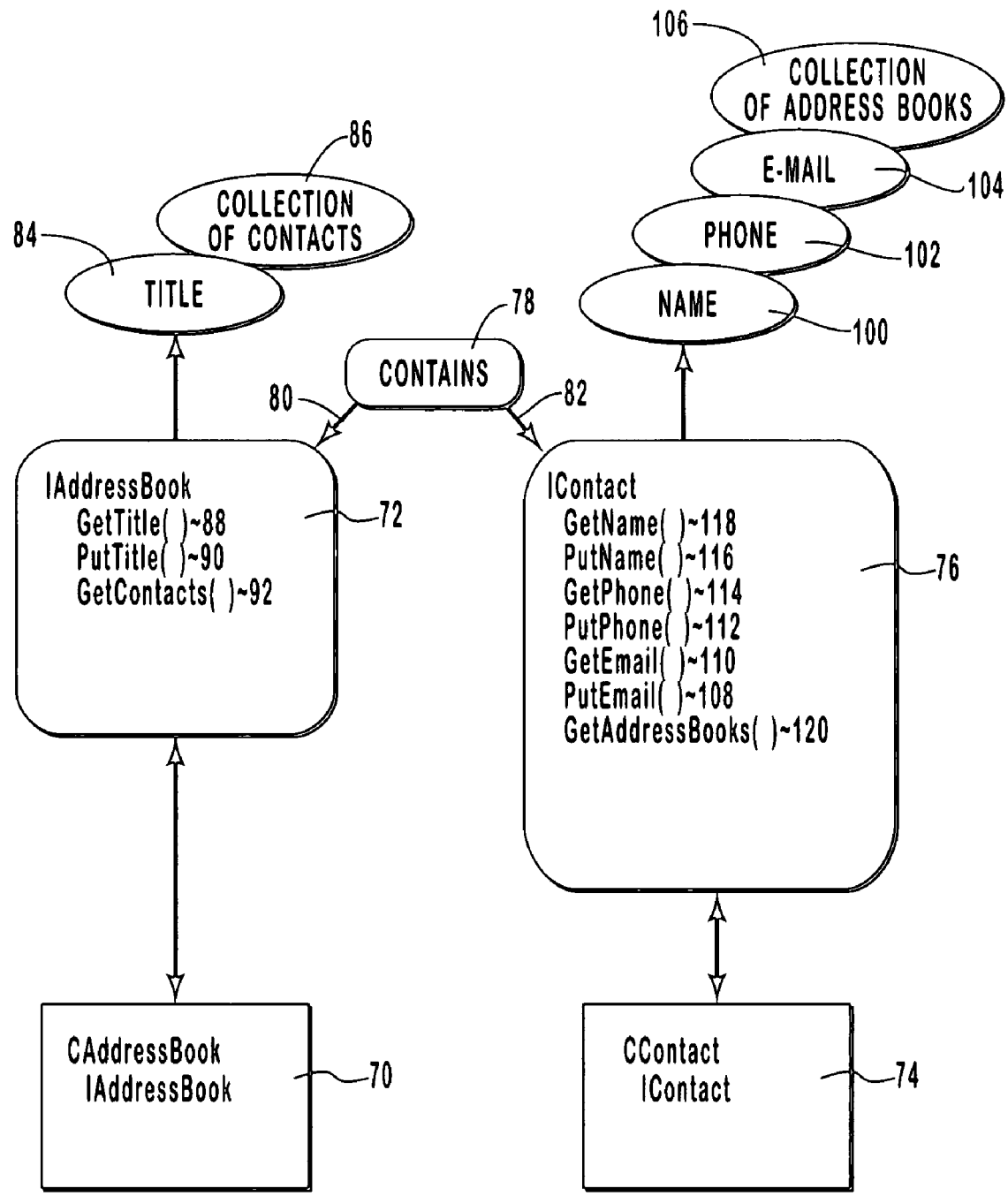
FIG. 2 is a logical diagram depicting the class, interface, and relationships for an address book example that has an address book class and a contact class.

Throughout this application, reference will be made to objects that are created or instantiated by computer software. Such objects will have a data portion associated therewith for storing information, and have methods or functionality associated therewith to provide desired functionality to a client accessing the object. Typically, the methods of the object will be directed in part to manipulating the object's data. Such an abstract object has an associated state that is the cumulative effect of methods operating on the data. It is this state that will be stored by the innovative object state repository as explained in this application.

As used herein, the term "objects," refers to software objects pertaining to a binary object model and that have binary extensibility through wrapping. Furthermore, such objects are interface-based meaning that an object is only used or operated through specific "interfaces" as defined hereafter and an interface-based binary object model will entail objects having multiple interfaces. In this sense, an object is only known through its interfaces and there is no specific reference to an object in its entirety.

An object may be active or loaded meaning that it is a functional part of a software program or system. An object is said to be persisted when the data portion or properties are stored, though it is more accurate to refer to the state of an object as being persisted. At a later time, an object of the same class may be instantiated and restored to the same state as the original object using the previously persisted object state.

As used herein, the term "binary extensibility" or "wrapping" refers to creating new object classes based on existing object classes regardless of the software code used to implement the various interfaces that make up a particular existing class. The extension model will expect interface functionality to be accessible through a binary convention regardless of actual source code used to arrive at the executable code. A "wrapped" object may use all or only some of the interface functionality implemented in a built-upon class, and some of the behavior of the built-upon class may be passed through to the clients of the wrapped object without the wrapped object knowing the nature of or even the existence of the behavior to be passed through.

One implementation of a binary object model and system that follows the characteristics of objects used throughout this application and as described above is the Component Object Model or COM as provided by Microsoft® Corporation as part of their Object Linking and Embedding (OLE) and ActiveX™ software technology. Reference to COM objects will be made as part of a specific and exemplary embodiment of the present invention. The invention, however, would fit any object model having the relevant characteristics of COM, namely, being an interface-based, binary object model supporting binary extensibility.

As used herein, the term "interface" refers to a specification for a particular and related subgroup of behavior and properties. Behavior or methods are typically a set of software subroutines, with each subroutine having a signature made up of the passed subroutine arguments, their order, and their data type. Further, each interface will have data associated therewith in the form of properties that are only accessible through a subroutine of the interface. Finally, an object may support multiple interfaces to thereby allow an object's characteristics to be defined by the interfaces that it supports and allow many classes to share behavior by supporting some of the same interfaces.

An interface, as part of the binary object system, also specifies a binary convention for accessing the software subroutines that support or implement the interface. Knowing the binary convention, the subroutine signatures that are defined by the interface, and a functional specification of how the subroutines are to behave, an object implementing a particular interface may be created using virtually any source code. Each such independently created object would be wholly unique and may represent internal data in a variety of different structures but from a binary standpoint would appear the same to an invoking client. Likewise, once an interface has been implemented and reduced to its binary form, any client may access the methods through the binary convention.

As used herein, the term "class" refers to a definition for directing a CPU to create an instance of an object. A class, therefore, will implement the interfaces that make up a given object and therefore is a template for creating objects. A class may be a source code definition that is compiled into executable code that will create run-time storage for the properties of an object and executable code to support the interface methods.

As used herein, the term "property" refers to a piece of data associated with an object. Further, the property may only be accessed through the appropriate interface method (e.g., subroutine). For example, for purposes of the presently preferred embodiment a "get" property subroutine and "put" property subroutine are implemented for retrieving and storing values for a particular property, respectively.

As used herein, the term "collection" refers to a special variant for a kind of property. More specifically, it is a set-valued property meaning that multiple items are formed into a collection. An item includes, but is not limited to, scalar values, such as integers, strings, etc., or may be an object (e.g., a handle to an interface of an object). Each collection will support methods for adding or removing an item as well as finding a particular item within the set and returning a count of how many items are in a set.

Throughout this application, when dealing with specific classes, a "C" will precede the class name so as to identify the name as that of a class. In like manner, an "I" will precede an interface name so as to identify name as that of an interface. For example, an object representing a square and having an interface to allow drawing of the square would be created by the CSquare class and would implement an interface IDraw that would include a method draw or draw( ).

FIG. 1A is a logical diagram showing the relationship between classes and interfaces. A plurality of interfaces exist as specifications for operating on an object, accessing particular properties as explained previously, and accessing the object's other behavior, such as methods. Interface 52 supports a number of methods and has a number of properties, while interface 54 also supports a number of methods (different than those of interface 52) and a number of properties (again, different from those of interface 52). Interfaces are defined as necessary by designers of particular software programs to encapsulate a related set of functionality.

Class 56 is a template for creating objects having interface 52. Likewise, class 58 is a template for creating objects that have both interface 52 and interface 54. Thus we can see that a particular interface may be defined by completely different templates or actual pieces of software code. For example, class 56 may be written in C++ while class 58 may be written in some other programming language. However, when objects are created by class 56 or class 58, respectively, any program knowing the appropriate binary convention associated with the supported interfaces and the operation of the supported interfaces will be able to manipulate the object thus created as desired or to wrap and extend the object.

FIG. 1B is a logical diagram showing how a particular client may operate upon the instantiated objects (represented in clouds) through the specified interfaces. Object 60, created from class 56, supports interface 52. Client 62 accesses or operates upon object 60 through interface 52 by invoking the methods according to the binary convention. A client may be an application program, another object, or any other software entity. Object 64, created by class 58, supports both interface 52 and interface 54 giving client 62 access to the respective methods and properties through either or both interfaces. Finally, object 66 is another instance of class 56 and supports interface 52. Because each instantiation has its own data space, object 60 and object 66, though created from the same class 56 and supporting the same interface 52, will have different object states depending on how client 62 accesses and operates on the respective object through the interfaces.

It is important to recognize that an object, according to the present invention, is known to a client by its interfaces. Typically, on the tangible level, an interface will be accessed by a pointer, handle or other identifier that can be used by the client to eventually access the executable software through the binary convention established as part of the binary object system.

One example of the binary object system that is interface-based as explained above is the COM system by Microsoft. Each object according to the COM system must support a particular interface by definition. This interface, IUnknown, has a QueryInterface method that allows a client to inquire whether other interfaces are supported by the object by passing a globally unique identifier (GUID), called the interface identifier, that uniquely identifies the interface. If so supported, a pointer or reference to the interface is returned and the client may then access the functionality through COM's binary convention. Thus, IUnknown is an indicating interface that will lead to other interfaces supported by an object.

Object functionality may grow by adding new interfaces to an object that more advanced clients can access without harming the operation of older clients who are unaware of the new interfaces through the indicating interface IUnknown.

The binary convention in the COM object system for accessing the interface method is a reference to an interface's data area wherein the interface property values are stored in an implementation-specific format not normally known by the client. The first value of that data area, by definition, is another reference or pointer to a table of pointers known as a VTable. Each entry in the VTable is a pointer to a loaded executable code function that makes up one of the interface methods. In this manner, a client, given an interface pointer and a description of the interface may quickly find the correct subroutine to execute as desired. More details as to the details and way that COM is able to achieve binary extensibility and the binary linkage at the interface level may be found in COM specification documents.

For purposes of this disclosure and patent application, any general object-based system having such binary extensibility capabilities and being interface-based as explained previously will suffice as an underlying object system for implementing the present invention. A working knowledge of COM and OLE is presumed for purposes of understanding the implementation details of the currently preferred embodiment as explained hereafter. The COM/OLE technology is widely accepted in the computer industry and those skilled in the art will recognize application of the present invention to other similar object systems.

FIG. 2 is a logical diagram showing the class and interface relationship of an address book example that will be used throughout this application to illustrate the operation of the present invention. An address book will contain entries of information called contacts to represent persons. Each contact will contain information for a person's name, phone number, and e-mail address.

Two classes are defined for creating two different types of objects in order to logically implement the address book example as shown in FIG. 2. First is the CAddressBook class 70 that implements the IAddressBook interface 72 while the other is the CContact class 74 that implements the IContact interface 76.

Furthermore, there is a contains relationship 78 between the IAddressBook interface 72 and the IContact interface 76. The arrows 80 and 82, respectively, indicate that the IAddressBook interface 72 is the origin interface while the IContact interface 76 is the destination interface by definition. The contains relationship 78 itself, however, is a bi-directional link between the two interfaces and either interface is equally available to the other interface by navigating the contains relationship 78. The origin and destination designations affect the storage layout of relationship instances and the semantics of certain operations on relationships. A source object is where a navigational session begins and the target object is the resulting object that is reached by navigating the relationship.

The implementation of a relationship between objects as defined between specific interfaces that may be contained in a respective object is the subject matter of the present invention. Different embodiments will be shown that illustrate different ways that this can be achieved according to the present invention.

The IAddressBook interface 72 contains as data the title property 84 as well as a contacts collection 86. The values for the title property 84 and the contacts collection 86 are only available through methods defined on the IAddressBook interface 72. More specifically, the GetTitle 88 and the PutTitle 90 methods will retrieve or place a value into the title property 84, and the GetContacts method 92 will retrieve a contacts collection.

Collections have four different methods for manipulating the data therein: the Add and Remove methods will respectively place or delete an element into or from a collection; the Item method will retrieve a specific element from the collection; and the Count method will return the number of elements contained in the collection. Those skilled in the art will note that a collection may be implemented in a variety of different ways as will be shown hereafter in more detail. For example, a separate collection object may be used or a particular object may support an interface that defines collection functionality.

The contact collection 86 and address book collection 106 are used to implement the contains relationship 78 as will be shown in more detail hereafter. Furthermore, different embodiments will be shown for implementing the contains relationship 78.

In like manner, the IContact interface 76 has a name property 100, a phone property 102, and an e-mail property 104 in addition to an address book collection 106. In order to manipulate the properties and address book collection the following methods exist: GetName method 118; PutName method 116; GetPhone method 114; PutPhone method 112; GetEmail method 110; PutEmail method 108; and GetAddressBooks method 120. These methods all operate in like manner as explained previously with the methods of the IAddressBook interface 72 to manipulate the data values of the name property 100, phone property 102, and e-mail property 104, respectively, and the address book collection 106.

Figure 3:
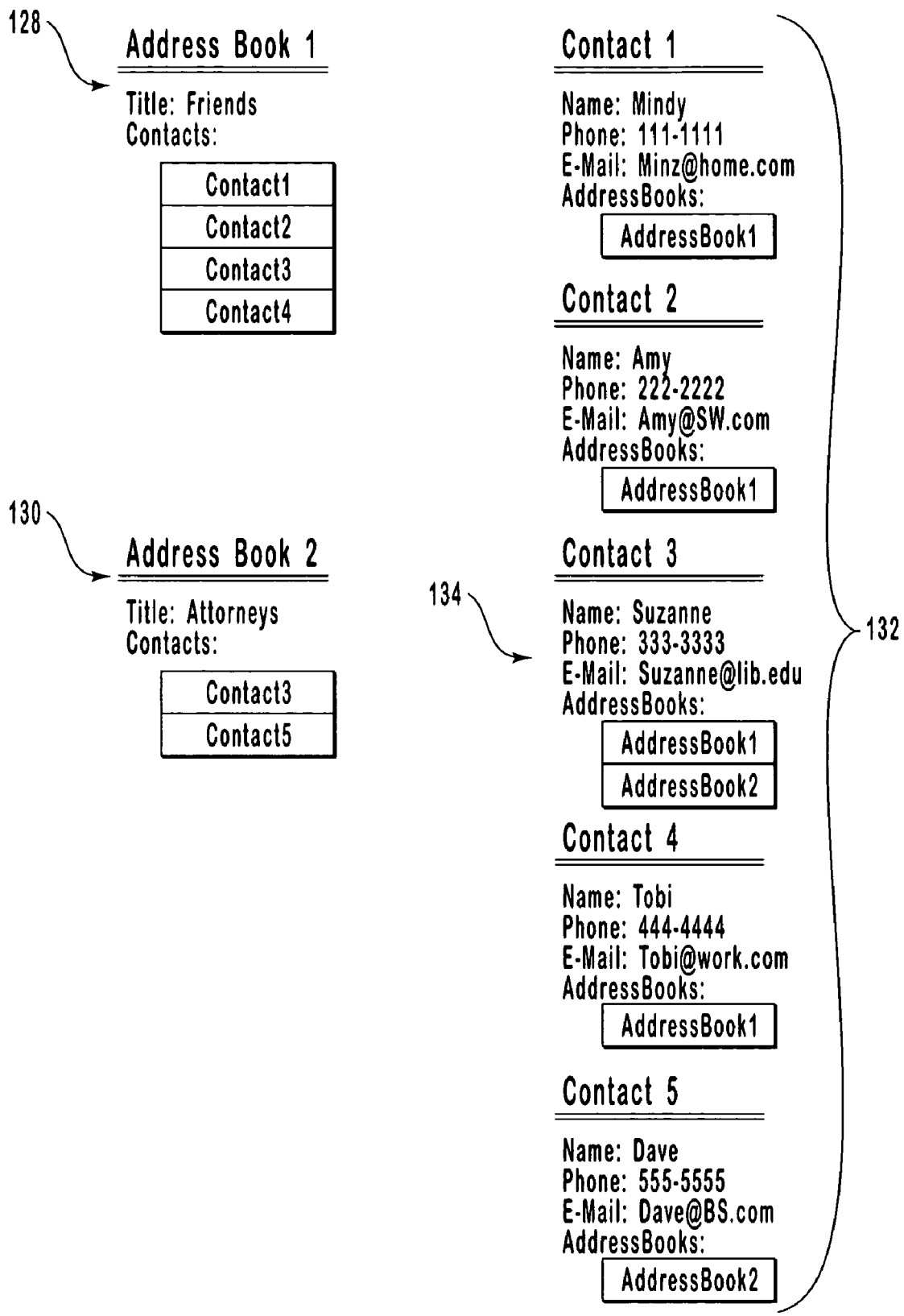
FIG. 3 is a diagram showing the values for a number of contacts and address books according to the logical model in FIG. 2. Specifically, the property information for five contacts and two address books is shown.

FIG. 3 is a drawing of actual data values to be used with objects for the address book example structurally illustrated in FIG. 2 and shows the interrelationships between address books and contacts. Shown in FIG. 3 is address book 128 with the title of "Friends" containing four individual contacts. Address book 130, on the other hand, is entitled "Attorneys" and contains only two contacts. A group of five contacts 132 is shown each having unique values for the respective properties including the address books that contain the contact. Each contact has a name property, a phone property, and an E-mail property. It may be noted that contact 134 is included in both address book 128 and address book 130.

Figure 4:
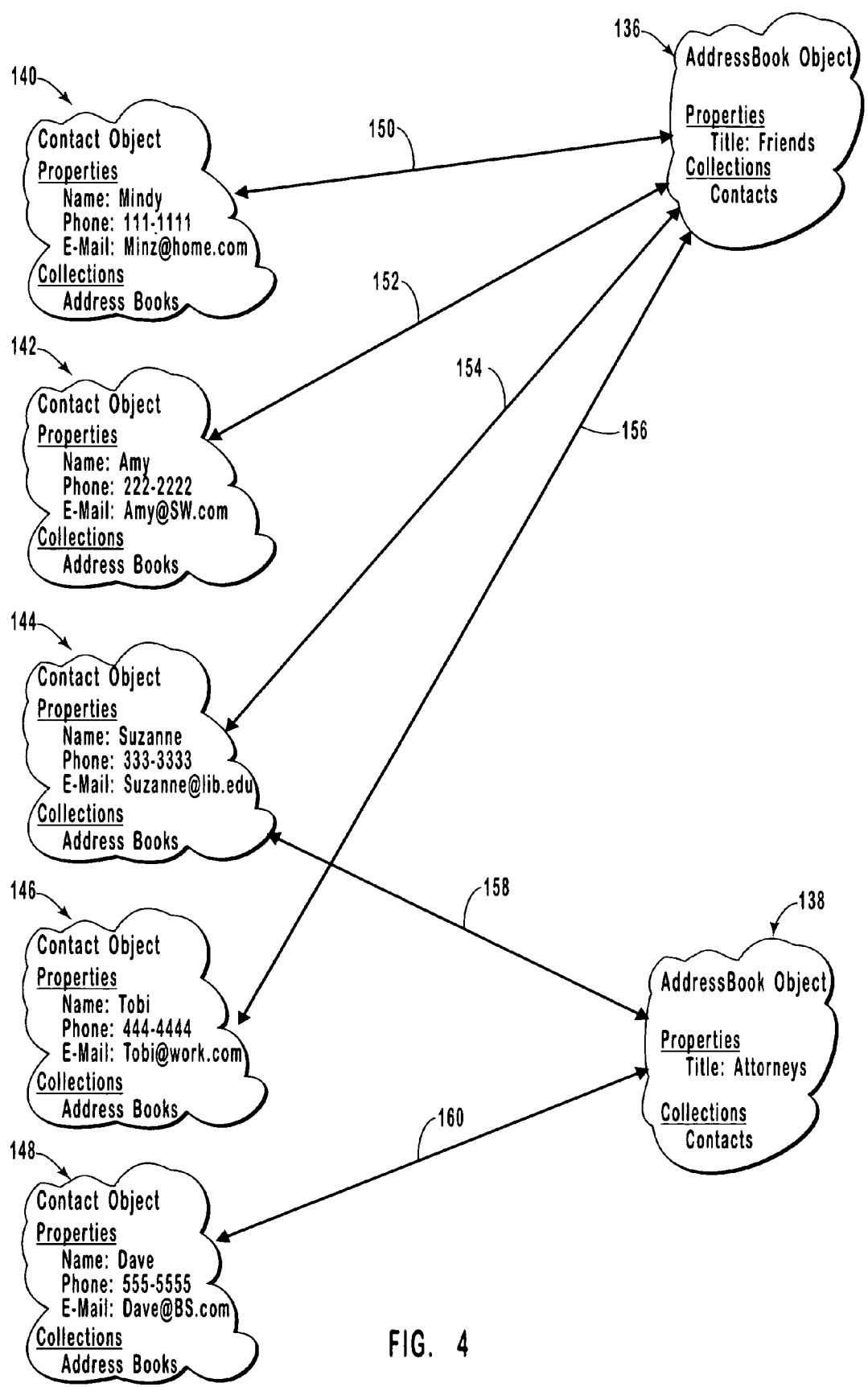
FIG. 4 is a logical drawing showing how the address book example as defined in FIG. 2 with the data of FIG. 3 would appear in terms of instantiated objects and relationships between those instantiated objects.

Referring now to FIG. 4, the relationships between the objects that make up the address book example illustrated by the logical diagram shown in FIG. 2 and using the data as shown in FIG. 3 is readily seen. Address book objects 136 and 138 will have relationships to the contact objects logically "contained" therein. In like manner, contact objects 140, 142, 144, 146 and 148 will have a relationship with the respective address books that they are "contained by."

Since the relationship is bidirectional, the lines making the links between the objects have arrows on both ends as shown in FIG. 4. The relationship between address book object 136 ("Friends" address book) and contact object 140 is represented by line 150. Likewise the relationships between address book object 136 and contact objects 142, 144, and 146, respectively, are represented by lines 152, 154, and 156, respectively. For address book object 138 ("Attorneys" address book), the relationship with contact object 144 and contact object 148, respectively, is represented by lines 158 and 160, respectively. Note that contact object 144 ("Suzanne") is related to both address book object 136 and address book object 138 as represented by lines 154 and 158, respectively.

A relationship according to the present invention is a logical link between two interfaces on two objects rather than between the two objects directly. Typically, each interface will support collections of either related objects or of relationship objects that will lead to the related objects. Each of two related objects will be listed in the object collection of the corresponding related object. Furthermore, since the relationship is based on an interface supported by an object rather than a class used to create the object, different kinds of objects may be easily related as long as the related interface is supported.

Figure 5A:
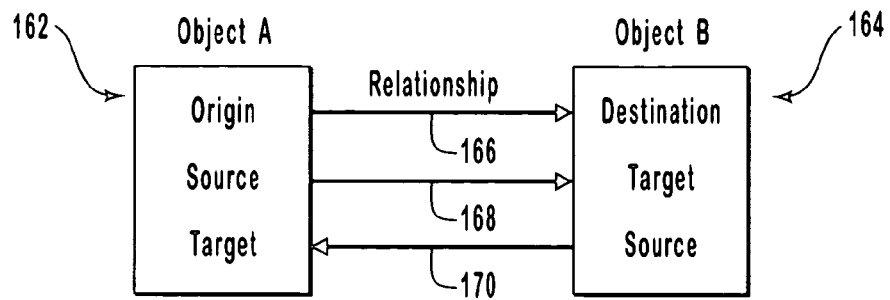
FIGS. 5A and 5B are terminology diagrams to explain how the objects would be related based on interfaces.
Figure 5B:
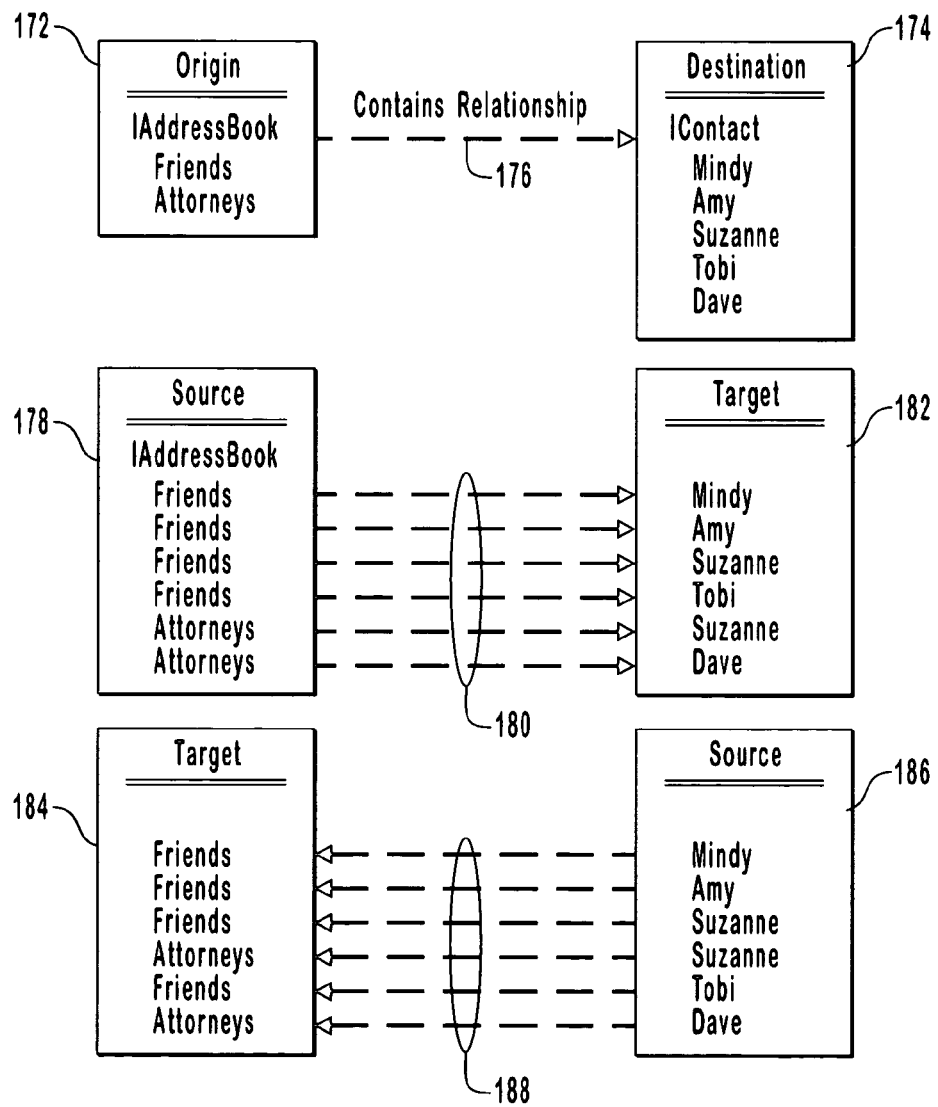

Referring now to FIGS. 5A and 5B, definitional terminology and navigational terminology will now be developed. FIG. 5A shows object A 162 having a relationship to object B 164. Relationships are defined on interfaces that are supported by an object and one interface will be designated the origin, by definition, while the other related interface will be designated the destination, again by definition. As shown in FIG. 5A, object A 162 supports the origin interface while object B 164 supports the destination interface with the relationship being defined directionally from the origin to the destination as shown by directional arrow 166. The definitional designation as origin or destination for a particular interface is used logically by the designer of the system and for internal tracking of the relationships, however, the actual relationship between the objects is bidirectional and either of the related objects is available from the other by navigating the relationship.

In designating navigation, the beginning point object containing one of the related interfaces is designated the source object while the end point of the navigation is the target object containing the other related interface. Therefore, object A 162 may be the source object or the target object, depending on the direction of the navigation as shown by directional arrows 168 and 170. Likewise, object B 164 may also be either the target object or the source object depending on navigational direction again as shown by respective directional arrows 168 and 170.

Referring now to FIG. 5B, the relationship as defined in the logical diagram of FIG. 2 for the address book example is shown along with the data of FIG. 3. By definition, the origin interface is the IAddressBook interface while the destination interface is the IContact interface. As shown in FIG. 5B, the IAddressBook interface is supported by the address book object entitled "Friends" and the address book object entitled "Attorneys" (address books objects 136 and 138, respectively, as shown in FIG. 4) as shown enclosed by box 172. Likewise, the destination interface is IContact with five objects having the name properties "Mindy," "Amy," "Suzanne," "Toby," and "Dave" (corresponding to contact objects 140, 142, 144, 146, and 148, respectively, of FIG. 4) as shown enclosed by box 174. The "Contains" relationship defined between the interfaces is shown by the directional arrow 176.

The box 178 with the plurality of directional arrows 180 into box 182 illustrates how each of the address book objects can be the source object in navigation towards each of the related target objects enclosed by box 182. This shows all of the possible source-to-target object navigational possibilities from the address book objects to the contact objects of the address book example shown graphically in FIG. 4.

Box 184 shows the same address book objects as being target objects from a navigation originating from the source objects enclosed in box 186 following the plurality of arrows 188 into the target objects. Again, all the possibilities for the contact object being the source and an address book object being the target for the address book example using the data of FIG. 3 are shown. Again, each of these relationships are shown graphically in FIG. 4.

Figure 6A:
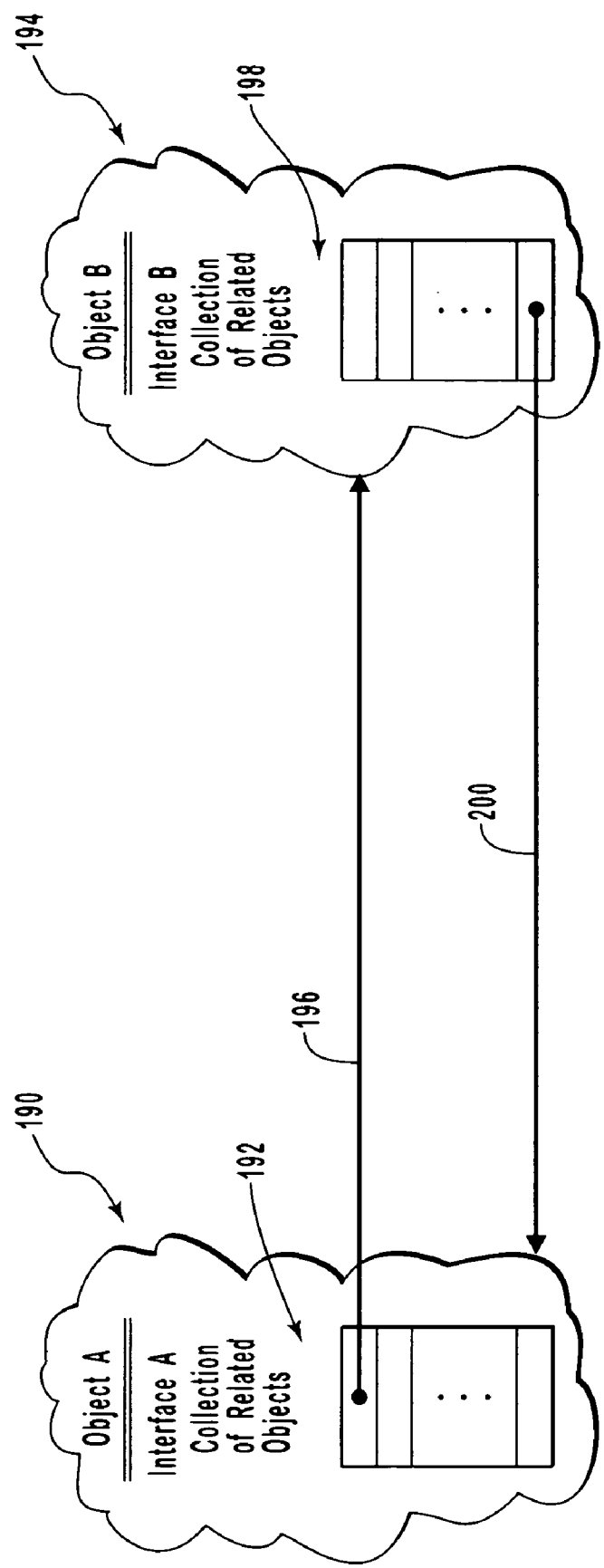
FIGS. 6A and 6B are object diagrams illustrating one embodiment of the present invention wherein a direct collection on the origin and destination objects is used to implement the relationship between objects.

Referring now to FIG. 6A, one embodiment showing the interface defined logical link is shown. Object A 190 supports interface A that is related to interface B. As part of interface A on object A 190, is a collection 192 of related objects. A collection of objects is a set-valued property that supports methods for adding an object, deleting an object, returning an object referenced by index count or ID, and for returning how many objects (target objects) are in the collection. Besides any other objects related to object A 190, there will be a reference in collection 192 to object B 194 represented by directional arrow 196.

Object B 194 will support an interface related to interface A, namely interface B. Furthermore, as part of interface B there will be a collection 198 of objects related to object B 194. In order to make the link between the related objects complete, collection 198 will contain a reference to object A 190 having the related interface A.

FIG. 6A represents the link or relationship between objects each supporting the related interfaces in its simplest fashion. The collections 192 and 198 are fully supported by the respective object 190 or 194. In other words, the method implementation, storage allocation, and other implementation details are completely handled by the classes that are used to instantiate or support objects corresponding to object A 190 or object B 194. The relationship between the objects having the two types of related interface is completed once the entries for the respective related target objects are entered into the respective collections found on the corresponding source objects.

In a currently preferred implementation using COM objects, the reference to another object is by way of an interface on that object. It is likely that the interface reference will be the related interface though any interface on that object may be used. The IUnknown interface that can be used as an indicating interface to arrive at other interfaces supported by an object when passed the GUID used to identify the particular interface may also be used according to the system design.

Figure 6B:
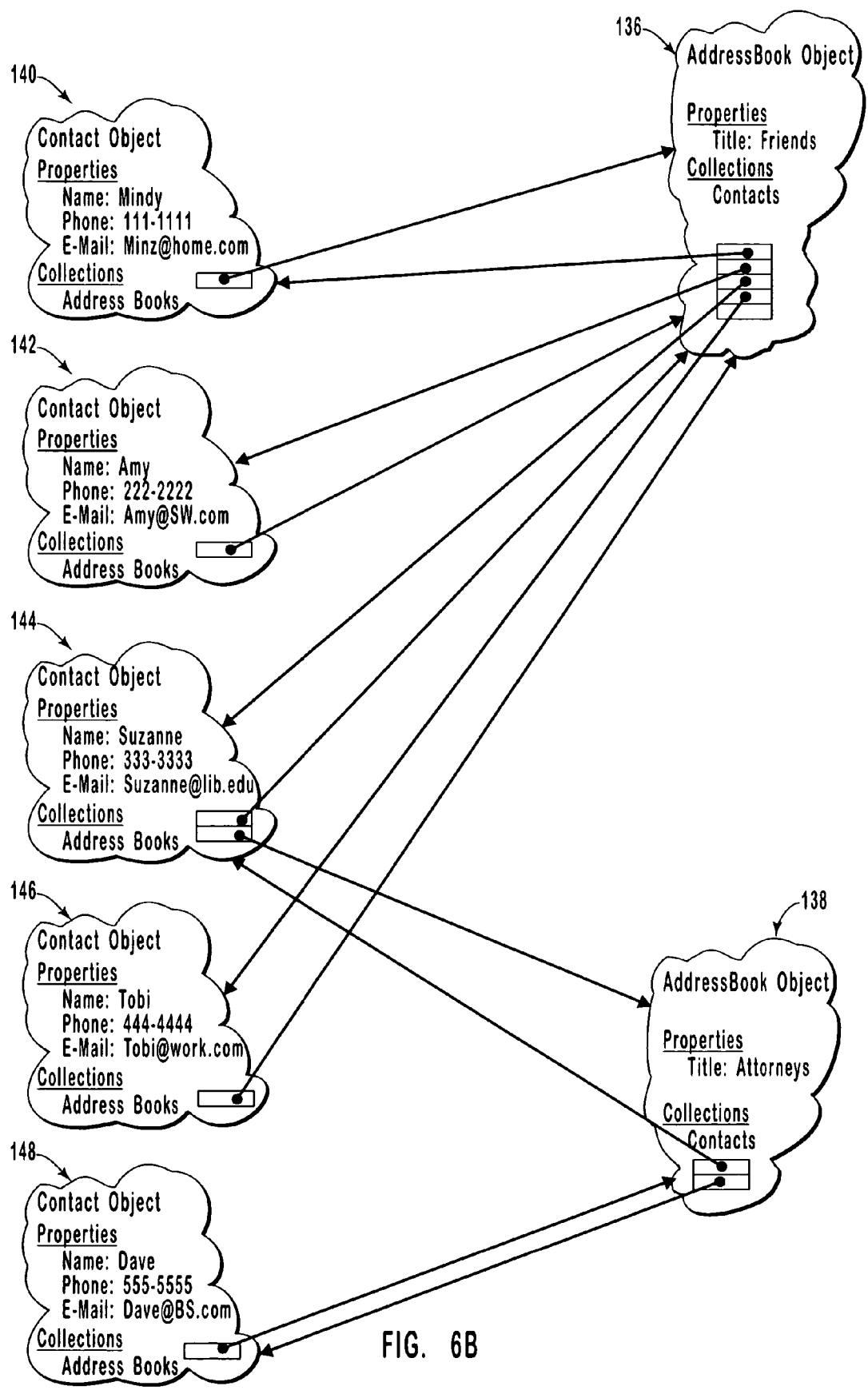

Referring now to FIG. 6B, the objects of FIG. 4 representing the address book example are shown as they would be related using the embodiment of FIG. 6A. This graphical representation shows that a navigation will occur straight from a source object to a target object in a direct fashion.

Figure 7A:
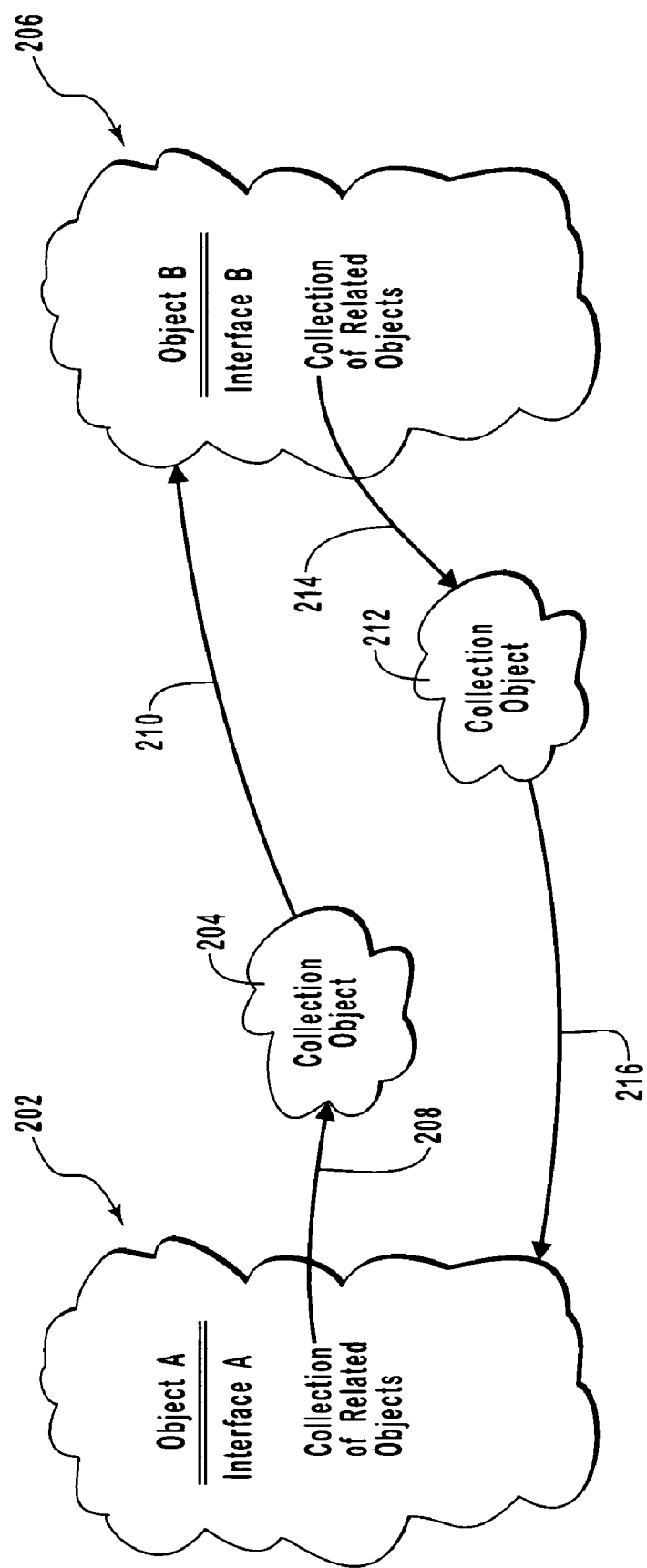
FIGS. 7A and 7B are object diagrams illustrating another embodiment of the present invention wherein separate collection objects associated with the origin and destination objects to implement the collection of related objects.

Referring now to FIG. 7A, another embodiment of the present invention is shown wherein the collections of related objects are implemented in separate collection objects. In this embodiment, the collection object will provide the collection methods and be responsible for allocating storage of the references to objects contained in the collection. By implementing the collection as a separate object, the code implementing the collection may be written one time with different instances of the class being used by the various related interfaces and objects implementing those interfaces thereby reducing duplicative programming.

In the embodiment of FIG. 7A, object A 202 supporting interface A that is related to interface B has reference to a collection object 204 that contains therein a reference to object B 206. Gaining access to the collection object 204 from object A 202 is represented by directional arrow 208. Implemented on interface A will be a method to gain access to the collection object 204 thereby allowing the client to manipulate the object as necessary to complete the navigation to the desired target object. The reference from within the collection object 204 to object B 206 is represented by directional arrow 210.

In similar fashion, the link between object A 202 and object B 206 is completed through listing on collection object 212 a reference to object A 202. Again, access to collection object 212 from object B 206 is represented by directional arrow 214 and the reference to object A 202 found within collection object 212 is represented by directional arrow 216.

A client navigating between object A 202 and object B 206 will use an object A 202 method to have access to collection object 204 and will use a method of collection object 204 in order to gain access to object B 206 and therefore complete the navigation from source object A 202 to target object B 206.

Navigation in the opposite direction will occur by starting at source object B 206, using a member method on object B 206 to arrive at collection object 212 and using an appropriate member method of collection object 212 to arrive at the target object A 202. By implementing the collection of related objects as separate objects themselves, custom behavior may be implemented to such objects using the native object system wrapping or extensibility mechanisms. This allows further customization and reusability of code.

Figure 7B:
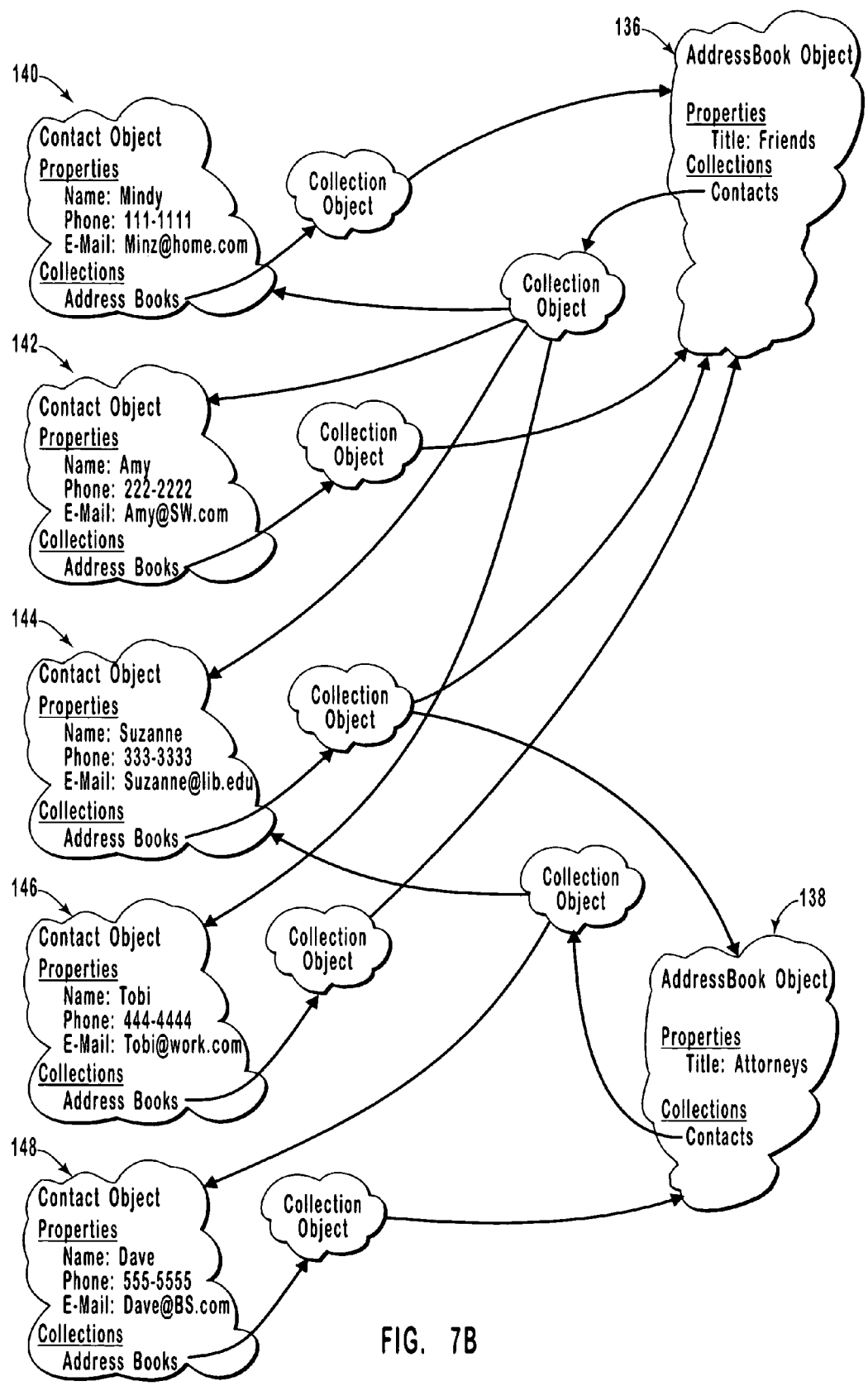

Referring now to FIG. 7B, the objects representing the address book example as shown in FIG. 4 are related according to the embodiment illustrated in FIG. 7A. A certain amount of efficiency is lost by using separate collection objects, however, greater flexibility is given to the system designer since no specific code to implement a collection need be written and wrapping or other extensibility mechanisms may be used to imbue the collection object with greater functionality.

Figure 8A:
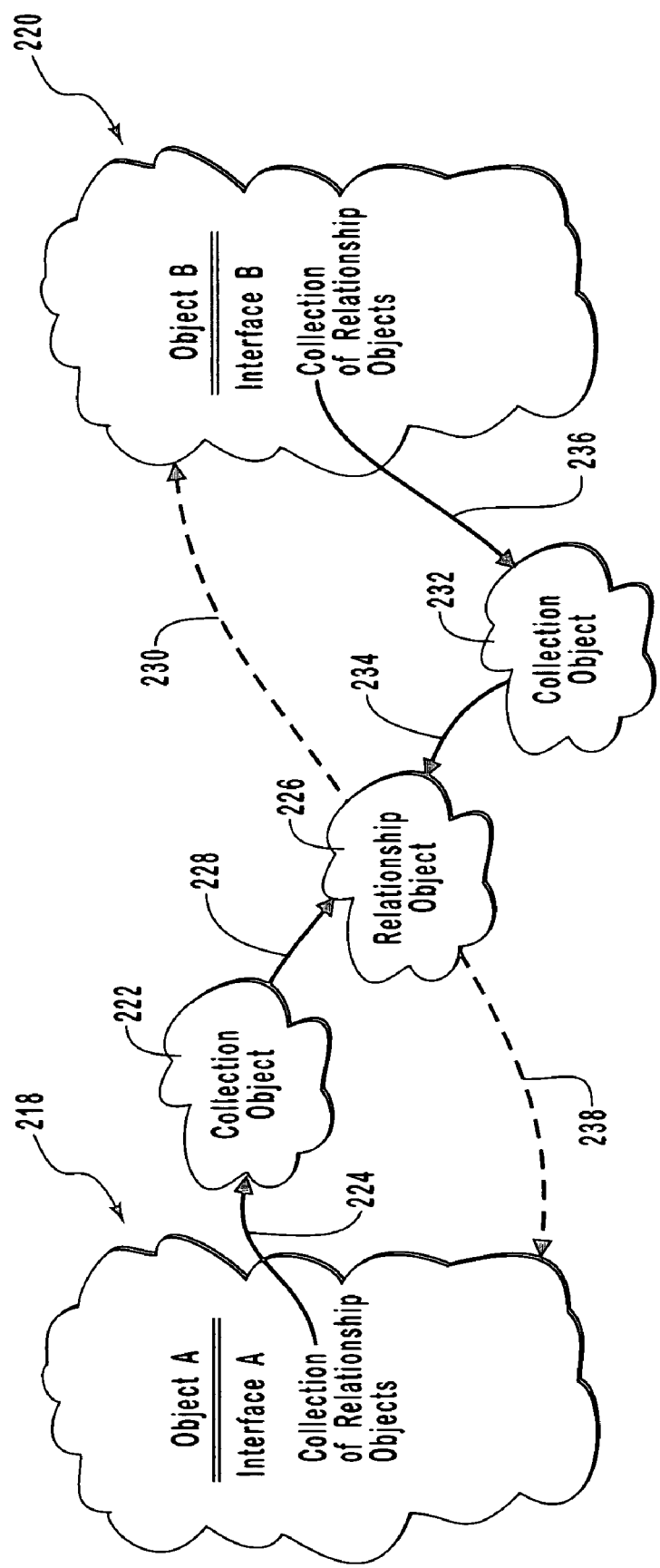
FIGS. 8A and 8B are object diagrams illustrating another embodiment of the present invention wherein collections of separate relationship objects are used to implement a relationship between objects.

Referring now to FIG. 8A, another embodiment of the present invention is shown wherein the collections are of specific relationship objects rather than the related objects themselves. The intermediate relationship object represents the actual relationship between two objects having the related interfaces and may have specific kinds of relationship behavior attributed thereto that provides greater functionality to the database clients using the relationship structure. Furthermore, customization may occur to a relationship object using the extensibility mechanisms associated with an object system so that the relationship behavior may be further customized.

As shown in FIG. 8A, object A 218 supports an interface A that is related to interface B. Furthermore, object B 220 having the related interface B is to be related to object A 218. Interface A of object A 218 will have access to collection object 222 through a method of object A as represented by directional arrow 224. The collection object 222 will have a reference to relationship object 226 as represented by directional arrow 228. Access is gained to the relationship object 226 through a member function found on collection object 222.

The relationship object 226 will contain the origin and destination references to each of object A 218 and object B 220 according to the relationship definition. Furthermore, relationship object 226 will have its own methods thereby giving it its own behavior to implement relationship functionality as necessary. For example, a method may be found thereon for getting the target object of a relationship. Naturally, the target object of the relationship will depend on the source object or the direction into which one arrives at the relationship object. For example, if the source object is object A 218 and the relationship object 226 has been accessed through collection object 222, then the target object would be object B 220. Again, the reference from the relationship object 226 to the object B 220 is represented by directional arrow 230. In contrast, if the source object is object B 220, then the relationship object 226 will provide a reference to the appropriate target object A 218.

For the relationship to be fully defined between object A 218 and object B 220, the collection object 232 associated with interface B found on object B 220 must have contained in the collection implemented thereon a reference to the relationship object 226 as represented by directional arrow 234. Again, access to collection object 232 will be through a method found on the object B 220 as represented by directional arrow 236. The relationship object 226 will, through its methods, give access to the object A 218 as represented by directional arrow 238.

The navigational path between object A 218 to object B 220 will be from object A 218 to collection object 222 that contains a collection of all relationship objects representing relationships between object A and various related objects. One such relationship object is chosen as part of the navigation. For example, relationship object 226 may be chosen which, in turn, will be able to give references to the two objects that are related. From there, the related target object, object B 220 may be accessed using the appropriate method.

Figure 8B:
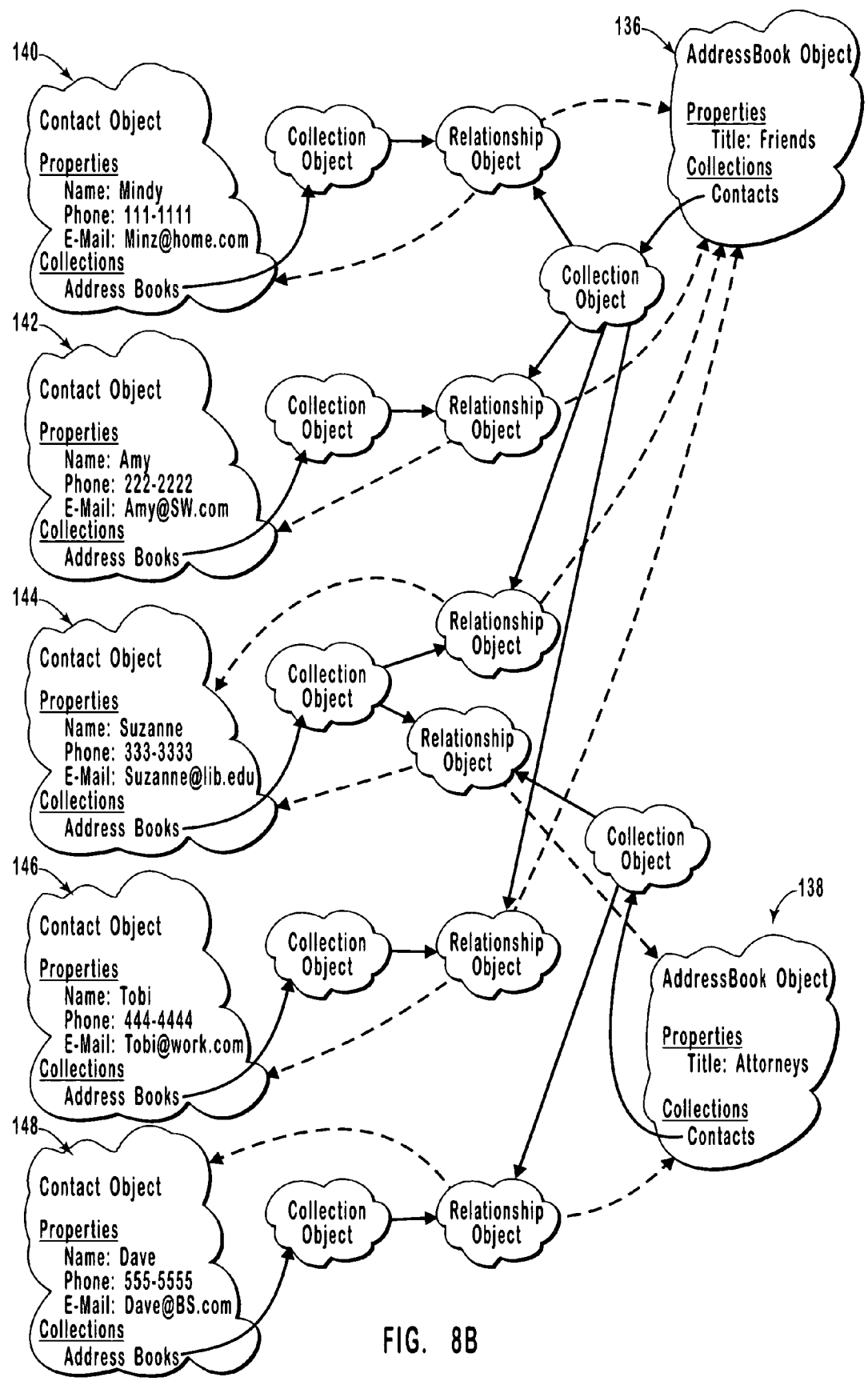

Referring now to FIG. 8B, the objects representing the address book example as shown in FIG. 4 have the relationships implemented using the embodiment shown in FIG. 8A. While such a configuration increases the navigation overhead by placing an additional relationship object in the navigational path between related objects, specific forms of functionality may be implemented in the relationship object to give a more robust functionality to a system depending on the application. For example, validation methods may be implemented to assure that during the creation of a particular relationship that certain rules are followed.

Figure 9A:
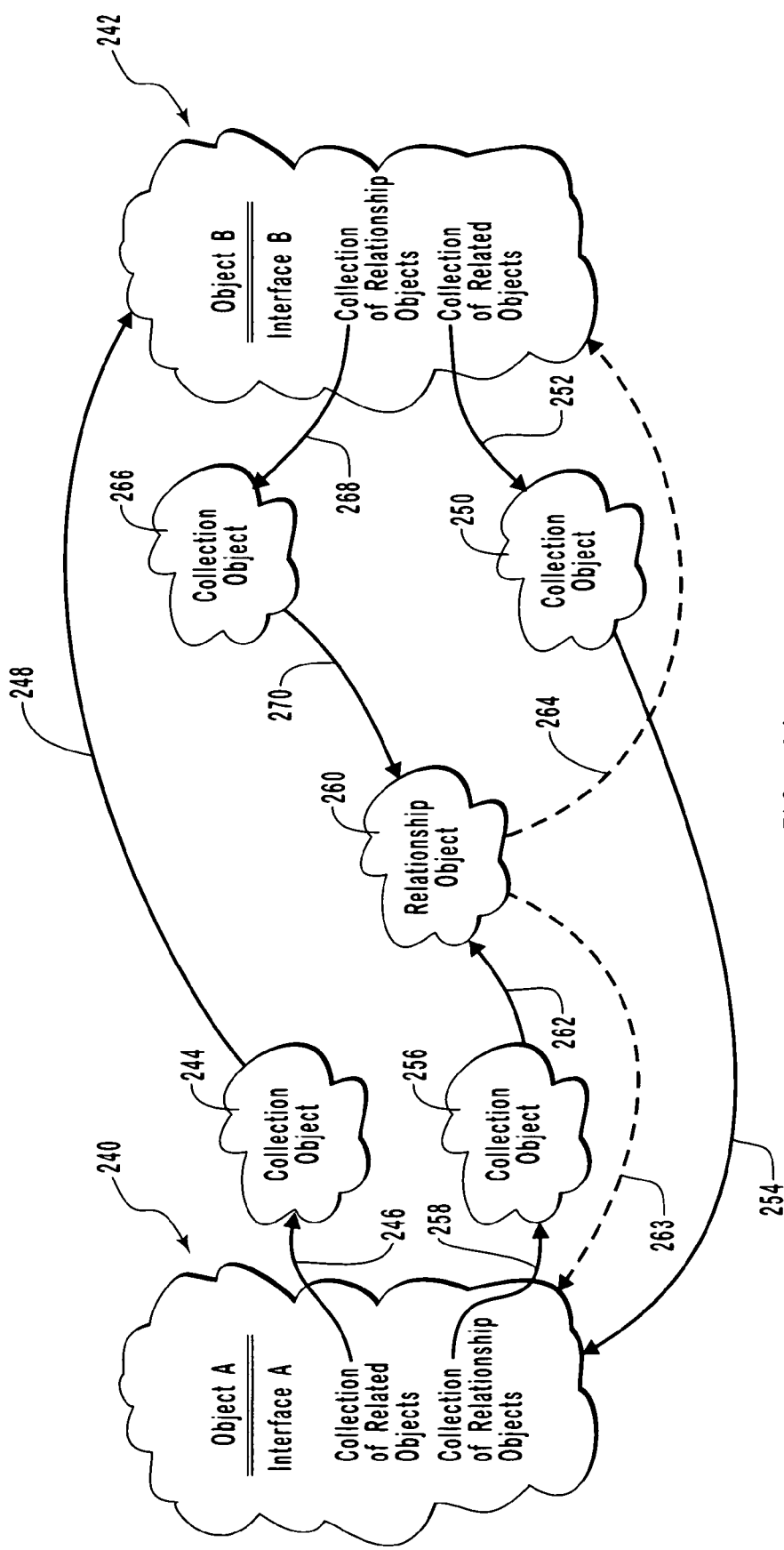
FIGS. 9A and 9B are object diagrams illustrating another embodiment of the present invention that utilizes two collections with each object; one indicating the target objects, and the other indicating relationship objects. This embodiment effectively combines the embodiments shown in FIGS. 7A and 7B and the embodiment shown in FIGS. 8A and 8B.

Referring now to FIG. 9A, another embodiment of the present invention is illustrated where two collection objects are used to represent two different kinds of collections. One is used as a collection of related objects while the other is used as a collection of relationship objects used to arrive at the related object. In essence, such an arrangement simply combines the configuration shown for the embodiment illustrated in FIG. 7A and the embodiment illustrated in FIG. 8A.

Object A 240 having an interface A that is related to an interface B contained on object B 242 is related first through collection object 244 having a collection of related objects. This collection object 244 is accessed by a method of object A 240 as represented by directional arrow 246. Finally, the related object, object B 242, is accessed from collection object 244 through a method as shown by directional arrow 248 representing the reference to object B 242.

Conversely, object B 242 has a collection object 250 associated therewith and accessed by a method as represented by directional arrow 252, the collection object 250 getting access to object A 240 through a method as shown by directional arrow 254 representing the reference to object A 240. This is in the same manner as explained previously in connection with the discussion for the embodiment shown in FIG. 7A.

Additionally, FIG. 9A shows another navigational pathway between related objects, object A 240 and object B 242. Object A 240 may have access to collection object 256 by means of a member function as represented by directional arrow 258. Collection 256 contains references to relationship objects representing each and every relationship that object A 240 may have a relationship with. As shown, the collection object 256 has reference to relationship object 260 through a method contained thereon as represented by directional arrow 262 representing the reference to relationship object 260. From the relationship object 260 access may be made to either object A 240 as shown by directional arrow 263 representing a reference to object A 240 or to object B 242 as shown through directional arrow 264 representing a reference to object B 242. If navigation begins at object A 240, a method of collection object 260 will be used to gain access to the object B 242.

Conversely, object B 242 will have associated therewith collection object 266 that can be accessed by a method as shown by directional arrow 268 representing access to the collection object 266. In order for the link between object A 240 and object B 242 to be complete, collection object 266 must have a reference to relationship object 260. Relationship object 260 will be accessed through a method found on collection object 266 as represented by directional arrow 270 representing reference to the relationship object 260. Again, from the relationship object 260 object A 240 may be accessed using methods and this is shown by the directional arrow 262 representing reference to object A 240.

Using the intermediate relationship object 260 operates in the same manner as shown previously in connection with FIG. 8A. By combining the two different embodiments as shown in FIGS. 7A and 8A, clients navigating between object A 240 and object B 242 (in either direction) have two different pathways from which to choose to perform the navigation. By going through the simpler pathway of a collection of related objects using the single collection object implementation as illustrated in detail in FIG. 7A and explained previously, quicker access is achieved. By using the intermediate relationship object with the extra overhead of making another object access and associated processing as illustrated in detail in FIG. 8A and explained previously, more robust functionality and greater capabilities are achieved. By implementing the object relationship as shown in FIG. 9A, the best of both worlds are presented to a client and a client may navigate the relationships in the most appropriate manner.

Those skilled in the art will note that providing access to the respective collection objects from related object A 240 or object B 242 can be achieved in different ways. For example, different methods of the same interface managing the contacts or address books collection will yield access to the object collection object or the relationship collection object.

Figure 9B:
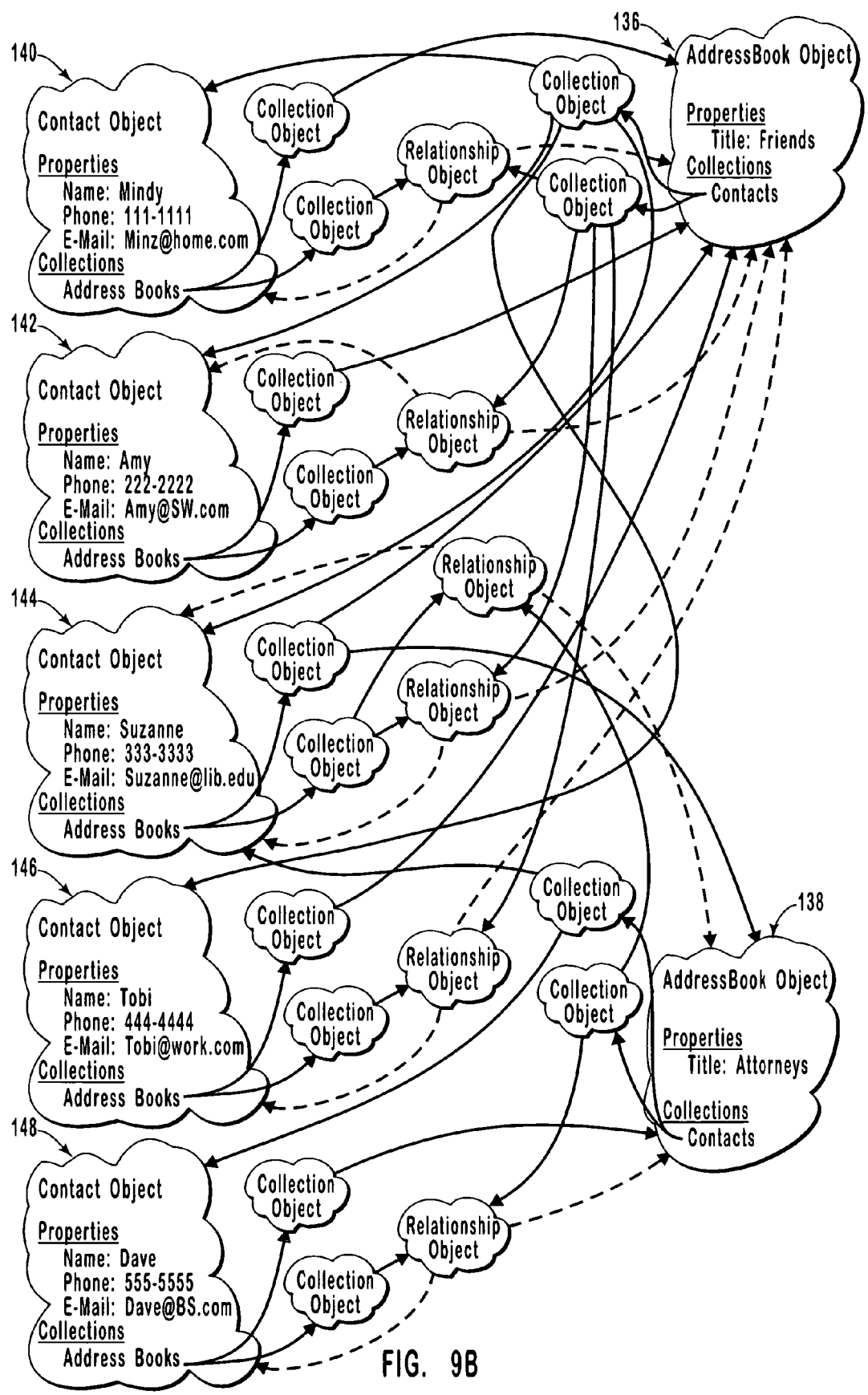

FIG. 9B shows the interrelationship between the objects of FIG. 4 representing the address book example with the relationships implemented according to the embodiment shown in FIG. 9A. By duplicating the relationship between the related objects using the direct collection method and the intermediate relationship object method, a client may choose the method of navigation based on client requirements.

Figure 10A:
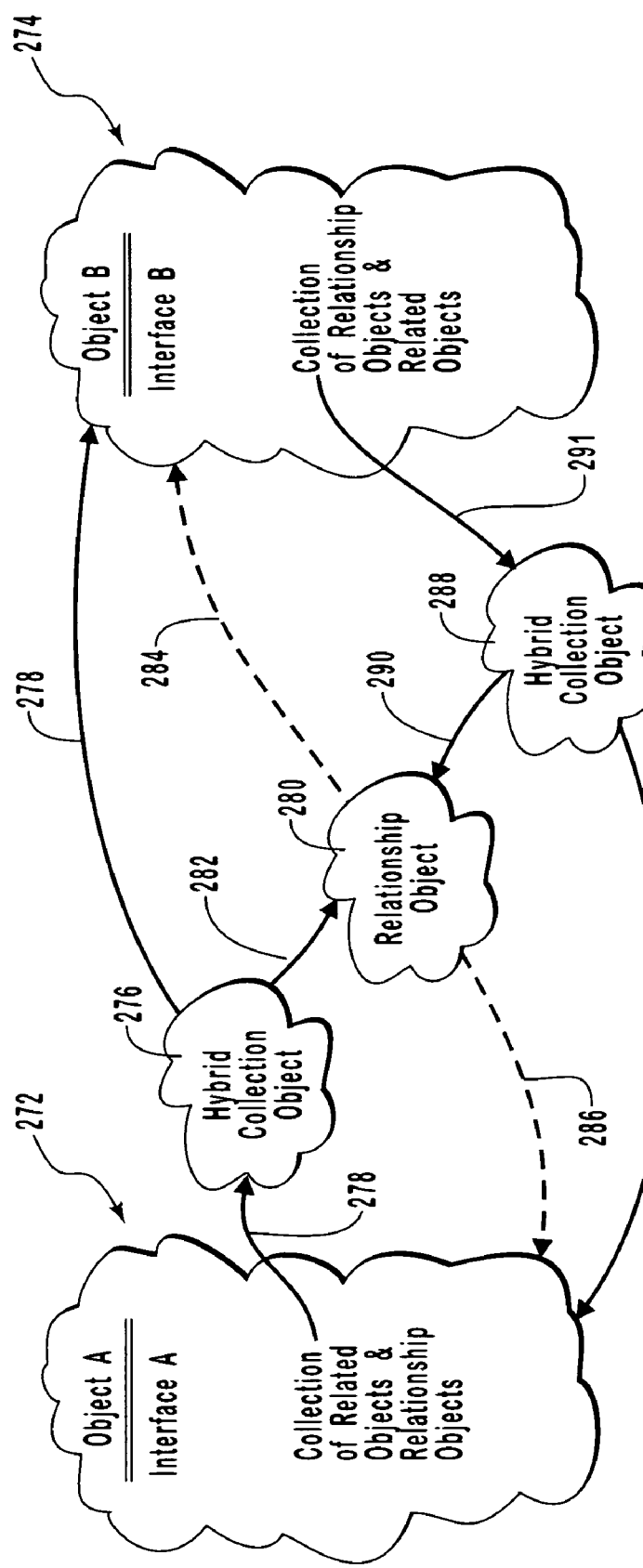
FIGS. 10A and 10B are object diagrams showing another embodiment of the present invention wherein a single hybrid collection object that will represent a collection of target objects and relationship objects in order to implement a relationship according to the present invention.

Referring now to FIG. 10A, another embodiment of the present invention is used to create the relationship between object A 272 and object B 274. This embodiment utilizes a single hybrid collection object that may return a reference to the target object or a reference to a relationship object that in turn will be used to access the target object. This is similar to the embodiment of FIG. 9A except that rather than implement the separate collections on separate collection objects, a single hybrid collection object will implement both collections. In this manner, a client will access a single collection object and utilize the methods on that object for using the collections to access a related object or a relationship object that leads to the related object. Some implementation may use some form of automatic accessing to use a single method that returns access to a relationship object or the related object according to some rule thereby relieving the client designer from the programming tedium of distinguishing between collections.

As shown in FIG. 10A, object A 272 will have associated therewith a hybrid collection object 276 that may be accessed through a method as illustrated by the directional arrow 278 representing access to collection object 276. The hybrid collection object 276 manages two collections, namely, one collection of references to related objects and another collection of references to relationship objects defining a relationship between two objects. Methods of the hybrid collection object 276 will allow direct access to a related target object such as object B 274 as shown by the directional arrow 278 representing the reference to object B 274. Additionally, the hybrid collection object 276 will have methods allowing access to relationship object 280 as shown by directional arrow 282 representing the reference to relationship object 280. From the relationship object 280, access may be had to either object making up the relationship. The access to related target object B 274 is shown by directional arrow 284 representing reference to object B 274.

In order for the relationship link between object A 272 and object B 274 to be complete, the hybrid collection object 288 associated with object B 274 must have references to relationship object 280 and object A 272. Access to hybrid collection object 288 from object B 274 is through a method and is represented by directional arrow 291 representing such access. Furthermore, from hybrid collection object 288, access may be had to relationship object 280 by a method as shown by arrow 290 representing such access and access may be had to object A 272 through another method as shown by directional arrow 292 representing that access. From the relationship object 280, access is made to object A 272 by a method as represented by directional arrow 286.

Figure 10B:
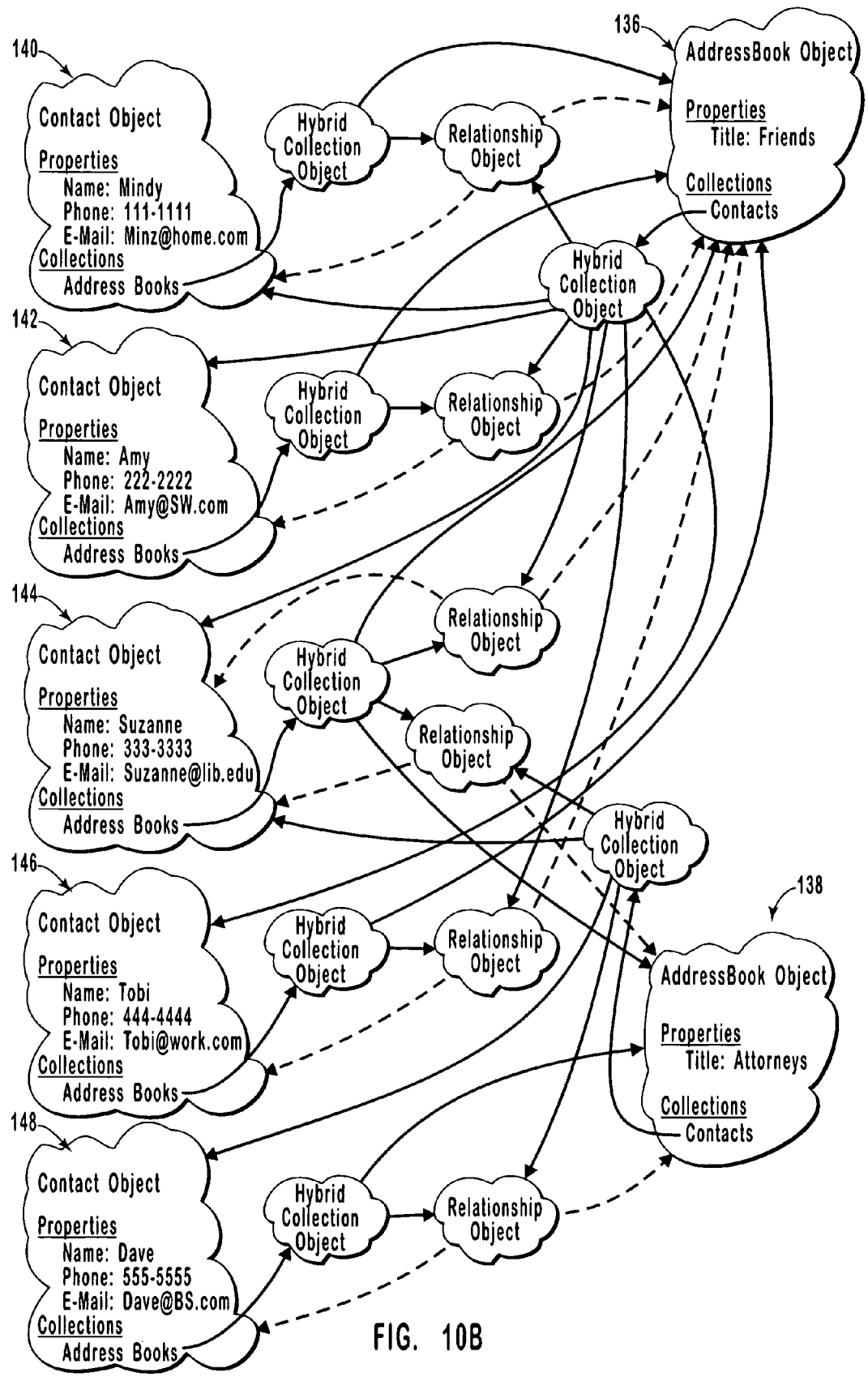

Referring now to FIG. 10B, the objects associated with the address book example as shown in FIG. 4 with their several relationships implemented using the embodiment of the present invention as shown in FIG. 10A is shown. By having a single hybrid collection object that manages two different collections, clients navigating between the objects can utilize a more uniform path for arriving at a single object implementing both collections.

Another embodiment that is consistent with the object diagram in FIG. 10A places objects in the hybrid collection object as either the related object itself (for direct access) or a relationship object, but not both. This contrasts with the approach explained previously that places both the related object and the relationship object in the hybrid collection object. This embodiment may find particular relevance when relating objects of different types that may dictate different treatment. For example, the relationships emanating from an object that have relationship-specific behavior could be represented as relationship objects while those that do not have behavior could be represented directly as the destination object. Thus, according to this alternative embodiment, some of the items in a hybrid collection object would be relationship objects (assuming multiple related objects) while others would be the related objects themselves. In particular, either relationship object 280 or object B 274 would be in the hybrid collection object 276, but not both.

All embodiments thus illustrated have a number of common factors according to the present invention although their implementation details are different. In each case, it is interfaces that define the relationship between objects. In other words, any objects including the two related interfaces may therefore be related by virtue of inclusion of those particular interfaces. In this manner, objects of different types and characters may be equally related in an object system where the objects may support multiple interfaces. This is in contrast to forming relationships between objects based on class definition of the object as is common practice.

In some object systems capable of supporting multiple interfaces, such as COM, a preferred object system for implementing the present invention, objects themselves are not directly accessible except through their interfaces. Therefore, in COM, a method that returns access to an object in its truest sense returns access to an interface into such object.

Additionally, though two interfaces of different types are defined to have a relationship between them, this "definition" means that each of those interfaces supports a collection that leads, either directly or indirectly, to those objects actually supporting the related interface. It is important to note that this collection may be empty therefore meaning that though an object may exist, no relationship exists to another object. The actual relationships can be made, removed, or modified during the lifetime of the object as appropriate. Furthermore, changes to collections associated with one object of a relationship must usually be accompanied by corresponding changes in collections associated with the other object of the relationship. For example, to delete a relationship, the link must be removed in both directions by removing references to related objects in both pertinent collections, each found on the related objects of the to-be-deleted relationship.

The object relationships according to the present invention and described in the various embodiments may be created by a computer program product directing and controlling a general purpose computer. The computer program product will consist of some medium such as magnetic disks or CD-ROM having computer readable program code means to configure the computer. The program code means will configure or cause the computer to make the relationships as described including all of the objects themselves. Furthermore, the program code means implementing the present invention will interact with existing program code means and additional program code means as a client to fully implement the configuration of the general purpose computer.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed is:

1. A computer program product for implementing, in a computer capable of supporting multiple objects each having at least one interface, a method of establishing a relationship between the objects by linking object interfaces to objects as opposed to establishing relationships between entire objects, the computer program product comprising:

a computer-readable storage medium storing computer-executable instructions for performing the method, including:

instantiating a plurality of objects at the computer, each of the plurality of objects being an instance of one or more classes established at the computer, wherein the plurality of objects includes at least:

an origin object that includes an origin interface; and a destination object that includes a destination interface; and establishing a relationship between the origin object and the destination object by establishing:

a first collection supported by the origin interface, the first collection including a logical link to the destination object, the logical link of the first collection including a reference to a first collection object, which includes a reference to a relationship object, which in turn includes a reference to the destination object, thereby logically linking the origin interface and the destination object;

the logical link included in the first collection further comprising a reference to an additional collection object that in turn includes a reference to the destination object, thereby further logically linking the origin interface and the destination object; and a second collection supported by the destination interface, the second collection including a logical link to the origin object, the logical link of the second collection including a reference to a second collection object, which includes a reference to the relationship object, which in turn includes a reference to the origin object, thereby logically linking the destination interface and the origin object, the logical link included in the second collection further comprising a reference to another additional collection object that in turn includes a reference to the origin object, thereby logically linking the destination interface and the origin object.

2. A computer program product for implementing, in a computer capable of supporting multiple objects each having at least one interface, a method of establishing a relationship between the objects by linking object interfaces to objects as opposed to establishing relationships between entire objects, the computer program product comprising:
- a computer-readable storage medium storing computer-executable instructions for performing the method, including:
- instantiating a plurality of objects at the computer, each of the plurality of objects being an instance of one or more classes established at the computer, wherein the plurality of objects includes at least:
  - an origin object that includes an origin interface; and
  - a destination object that includes a destination interface; and
- establishing a relationship between the origin object and the destination object by establishing:
  - a first collection supported by the origin interface, the first collection including a logical link to the destination object, the logical link of the first collection including a reference to a first collection object, which includes a reference to a relationship object, which in turn includes a reference to the destination object, thereby logically linking the origin interface and the destination object,
  - the first collection object further including an independent reference to the destination object, thereby further logically linking the origin interface and the destination object; and
  - a second collection supported by the destination interface, the second collection including a logical link to the origin object, the logical link of the second collection including a reference to a second collection object, which includes a reference to the relationship object, which in turn includes a reference to the origin object, thereby logically linking the destination interface and the origin object,
  - the second collection object further including an independent reference to the origin object, thereby further logically linking the destination interface and the origin object.

3. In a computer capable of supporting multiple objects each having at least one interface, a method of establishing a relationship between the objects by linking object interfaces to objects as opposed to establishing relationships between entire objects, the method comprising:
- executing computer-executable instructions on one or more computer processors wherein executing computer-executable instructions causes the one or more computer processors to:
- instantiate a plurality of objects at the computer, each of the plurality of objects being an instance of one or more classes established at the computer, wherein the plurality of objects includes at least:
  - an origin object that includes an origin interface; and
  - a destination object that includes a destination interface; and
- establish a relationship between the origin object and the destination object by establishing:
  - a first collection supported by the origin interface, the first collection including a logical link to the destination object, the logical link of the first collection including a reference to a first collection object, which includes a reference to a relationship object, which in turn includes a reference to the destination object, thereby logically linking the origin interface and the destination object;
  - the logical link included in the first collection further comprising a reference to an additional collection object that in turn includes a reference to the destination object, thereby further logically linking the origin interface and the destination object; and
  - a second collection supported by the destination interface, the second collection including a logical link to the origin object, the logical link of the second collection including a reference to a second collection object, which includes a reference to the relationship object, which in turn includes a reference to the origin object, thereby logically linking the destination interface and the origin object,
  - the logical link included in the second collection further comprising a reference to another additional collection object that in turn includes a reference to the origin object, thereby logically linking the destination interface and the origin object.

4. In a computer capable of supporting multiple objects each having at least one interface, a method of establishing a relationship between the objects by linking object interfaces to objects as opposed to establishing relationships between entire objects, the method comprising:
- executing computer-executable instructions on one or more computer processors wherein executing computer-executable instructions causes the one or more computer processors to:
- instantiate a plurality of objects at the computer, each of the plurality of objects being an instance of one or more classes established at the computer, wherein the plurality of objects includes at least:
  - an origin object that includes an origin interface; and
  - a destination object that includes a destination interface; and
- establish a relationship between the origin object and the destination object by establishing:
  - a first collection supported by the origin interface, the first collection including a logical link to the destination object, the logical link of the first collection including a reference to a first collection object, which includes a reference to a relationship object, which in turn includes a reference to the destination object, thereby logically linking the origin interface and the destination object,
  - the first collection object further including an independent reference to the destination object, thereby further logically linking the origin interface and the destination object; and
  - a second collection supported by the destination interface, the second collection including a logical link to the origin object, the logical link of the second collection including a reference to a second collection object, which includes a reference to the relationship object, which in turn includes a reference to the origin object, thereby logically linking the destination interface and the origin object,
  - the second collection object further including an independent reference to the origin object, thereby further logically linking the destination interface and the origin object.

* * * * *